(12) United States Patent  (10) Patent No.: US 12,475,464 B2
Desai et al.  (45) Date of Patent: Nov. 18, 2025

(54) UNIFIED LOGIN BIOMETRIC AUTHENTICATION SUPPORT

(71) Applicant: PayPal, Inc., San Jose, CA (US)

(72) Inventors: Darshan Desai, Fremont, CA (US); Kishore Jaladi, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 155 days.

(21) Appl. No.: 17/565,788

(22) Filed: Dec. 30, 2021

(65) Prior Publication Data

US 2022/0122088 A1   Apr. 21, 2022

Related U.S. Application Data

(63) Continuation of application No. 15/691,898, filed on Aug. 31, 2017, now abandoned.

(60) Provisional application No. 62/411,940, filed on Oct. 24, 2016.

(51) Int. Cl.
*G06Q 20/40* (2012.01)
*G06Q 20/38* (2012.01)
*H04L 9/14* (2006.01)
*H04L 9/30* (2006.01)
*H04L 9/32* (2006.01)

(52) U.S. Cl.
CPC ........... *G06Q 20/40145* (2013.01); *G06Q 20/3821* (2013.01); *G06Q 20/3829* (2013.01); *H04L 9/14* (2013.01); *H04L 9/30* (2013.01); *H04L 9/3231* (2013.01); *H04L 9/3271* (2013.01); *G06Q 2220/00* (2013.01); *H04L 2209/56* (2013.01)

(58) Field of Classification Search
CPC ......... G06Q 20/40145; G06Q 20/3821; G06Q 20/3829; G06Q 2220/00; H04L 9/14; H04L 9/30; H04L 9/3231; H04L 9/3271; H04L 2209/56

See application file for complete search history.

(56) References Cited

U.S. PATENT DOCUMENTS 10,796,310 B2   10/2020  Hammad
2007/0106895 A1*  5/2007  Huang ................ H04L 9/3247
                                                      713/181
2011/0082801 A1*  4/2011  Baghdasaryan ...........................
                                                       G06Q 20/40145
                                                             705/75

(Continued)

OTHER PUBLICATIONS

Burr et al., Electronic Authentication Guideline, Aug. 2013, NIST, 800-63-2, p. 7 (Year: 2013).*

(Continued)

*Primary Examiner* — John W Hayes
*Assistant Examiner* — Taylor S Rak

(57) ABSTRACT

As disclosed herein, a token and/or a public/private key can be stored in a secure enclave that can be later used when a user logs into the payment provider's website. At that time, the user can simply swipe a fingerprint to complete a transaction. Thus, biometric authentication may be applied to complete the transaction. Moreover, the transaction can be completed across different browsers. In an implementation, a long-term token is not utilized. Instead, when a user opts into the disclosed implementation, a private and public key pair is generated on the client side device. The private key may be stored in the secure enclave and the public key may be sent to the payment provider. Thus, there may be no token involved to complete the transaction.

15 Claims, 12 Drawing Sheets

(56) References Cited

U.S. PATENT DOCUMENTS

| | | |
|---|---|---|
| 2013/0334308 A1 | 12/2013 | Priebatsch |
| 2014/0189360 A1 | 7/2014 | Baghdasaryan et al. |
| 2015/0257004 A1* | 9/2015 | Shanmugam ....... H04W 12/065 |
| | | 455/411 |
| 2017/0357967 A1* | 12/2017 | Sykora .................. H04L 63/083 |
| 2018/0089688 A1 | 3/2018 | Kohli |

OTHER PUBLICATIONS

White R., "How Computers Work", Illustrated by Timothy Edward Downs, Que Publishing, 7th Edition, Oct. 15, 2003, 23 pages.

\* cited by examiner

UNIFIED LOGIN BIOMETRIC AUTHENTICATION SUPPORT

CROSS-REFERENCE TO RELATED APPLICATIONS

This application is a continuation of U.S. patent application Ser. No. 15/691,898, filed Aug. 31, 2017, which claims priority to U.S. Provisional Patent Application No. 62/411,940 filed on Oct. 24, 2016, the contents of which are hereby incorporated by reference in its entirety.

FIELD OF THE DISCLOSURE

The present disclosure relates generally to techniques for user and/or device authentication that allow device-specific information to persist across sessions and to be associated with a user account.

BACKGROUND

Presently, a user may complete a transaction such as a purchase from an online retailer, by utilizing a fund, credit card, and/or bank account that is associated with the user's account with a payment provider such as PayPal™. When the user accesses the payment provider's website, a cookie may be stored on the user's device that enables the user to be identified when the user attempts to complete a subsequent transaction. However, if the user attempts to complete the subsequent transaction with a different web browser, then the previously stored cookie cannot be used and the user must again satisfy a series of challenges so that the payment provider can authenticate the user and complete the transaction. In addition, the cookie that is stored on user's device is not secure to the extent that it can be copied by another individual and provided to the payment provider in attempt to fool the payment provider into believing that the other individual is the user. Given these deficiencies, the user experience and underlying security involved in completing transactions need improvement.

In addition, there is no way to identify uniquely a device that uses an instant checkout. Such an instant checkout service may allow a user to checkout from a merchant's website without having to enter the user's login credentials (e.g., a name and/or a password) again. For example, a user may provide login credentials to a payment provide through the payment provider's application or the payment provider's website. Subsequently, when the user seeks to provide payment via the payment provider to a first merchant on a first website or application, and a second merchant on a second website or application, the user is not required to log into the payment provider for each separate purchase. Knowing a unique device-specific identification can be useful for risk assessment purposes of the payment provider. Current solutions for instant checkout may utilize a secure cookie-based solution. However, that secure cookie may be stolen and used on a bad-actor's device to feign identity of a legitimate user's device. A risk assessment system operating on the payment provider may not be able to discern if the bad actor's device is really a different device or not. Thus, there is a need to provide a more secure system for an instant checkout service of a payment provider.

SUMMARY

According to an embodiment, a system is disclosed that includes at least one non-transitory memory (e.g., a database) storing instructions and/or user account information, and one or more hardware processors communicatively coupled to the non-transitory memory. The one or more hardware processors may be configured to execute the instructions to cause the system to perform operations. The system may be configured to receive a request from a device of a user to complete a transaction. A transaction may be, for example, a payment, adding a bank account, a transfer of funds, and a request for funds. The device of the user may be, for example, a tablet, a smartphone, a laptop, or a desktop computer. The system may perform one or more operations that can determine that the user has previously agreed to complete transactions utilizing only a fingerprint, or other biometric marker, based on the stored user account information. The system may send an instruction that directs the device of the user scan a fingerprint, or other biometric marker, of the user.

The system may receive from the device of the user a token that is stored in a secure enclave on the device of the user. The token may be provided if the fingerprint, or other biometric marker, of the user provided in response to the instruction matches a previously registered fingerprint of the user associated with the device. The system may validate the token received from the user device. Responsive to validating of the token, the system may be configured to complete the transaction.

In some configurations, the system may receive a request from the device of the user to complete an initial transaction. The system may receive an indication from the user to complete subsequent transactions using a fingerprint, or other biometric marker. The system may send an instruction to the device of the user that directs the user to provide a fingerprint to the device. The device of the user may be configured to, subsequent to receipt of the instruction, obtain the fingerprint of the user with a fingerprint scanner connected to the device of the user. The device may compare the obtained fingerprint to the previously registered fingerprint.

The system may receive, from the device of the user, an indication that the fingerprint provided by the user matches the previously registered fingerprint. Responsive to the indication that the fingerprint provided by the user matches the previously registered fingerprint, the processor may send the token to the device of the user. The token may be stored in the secure enclave of the device of the user.

In some configurations, the system may send to the device of the user a message that is displayed on the device of the user. The message may offer the user the option to complete subsequent transaction using a fingerprint. In some configurations, the transaction is initiated on a third party website with a first web browser, and the request for completion of the transaction is initiated on a second web browser.

In an implementation, a computer implemented method is disclosed in which a request is received from a device of a user by a processor of a payment provider to complete a transaction. The device may be, for example, a tablet, a laptop, a smartphone, and a desktop computer. The transaction may refer to, for example, a payment, adding a bank account, a transfer of funds, and a request for funds. It may be determined that the user has previously agreed to complete transactions utilizing a fingerprint. An instruction may be sent that directs the device of the user scan a fingerprint of the user. A token may be received from the device of the user. The token may be stored in a secure enclave on the device of the user and be provided if the fingerprint of the user that is provided in response to the instruction matches a previously registered fingerprint of the user associated with the device. The received token from the user device may be validated, and responsive to the validation of the token, the transaction may be completed.

In some configurations, a request may be received from the device of the user to complete an initial transaction. An indication from the user to complete subsequent transactions using a fingerprint may be received. An instruction may be sent to the device of the user that directs the user to provide a fingerprint to the device. Subsequent to receipt of the instruction, the fingerprint of the user may be obtained with a fingerprint scanner connected to the device of the user. The obtained fingerprint may be compared to the previously registered fingerprint. An indication that the fingerprint provided by the user matches the previously registered fingerprint may be received from the device of the user. Responsive to the indication that the fingerprint provided by the user matches the previously registered fingerprint, the token may be sent to the device of the user. The token may be stored in the secure enclave of the device of the user.

In some instances, a message may be sent to the device and the message may be displayed on the device of the user. The message may offer the user the option to complete subsequent transaction using a fingerprint.

In some instances, the transaction may be initiated on a third party website with a first web browser, and the request for completion of the transaction may be initiated on a second web browser.

In an implementation, a system is disclosed that includes at least one non-transitory memory (e.g., a database) storing instructions and/or a public key. The public key and a private key may be a part of a key pair and the private key may be stored on a device. The private and public keys may be generated by the device. The system may include one or more hardware processors communicatively coupled to the non-transitory memory. The one or more hardware processors may be configured to execute the instructions to cause the system to perform operations. The system may be configured to receive the public key from the device. The public key may be stored to the non-transitory memory. The system may receive a request to complete a transaction and generate a nonce. The system may send the nonce to the device along with instructions that direct the device to obtain a fingerprint of the user. The device may be configured to encrypt the nonce utilizing the private key. The system may receive an encrypted nonce from the device. The nonce may be encrypted with the private key stored in the secure enclave of the device that can be accessed if the obtained fingerprint matches a previously registered fingerprint associated with the device. The system may be configured to decrypt the encrypted nonce with the public key stored in the at least one non-transitory memory. The system may compare the decrypted nonce to the nonce sent to the device. Based upon the comparison, the system may complete the transaction if the decrypted nonce matches the nonce sent to the device.

In some instances, the transaction may be initiated on a third party website with a first web browser, and the request for completion of the transaction may be initiated on a second web browser.

In an implementation, a system is disclosed that includes at least one non-transitory memory (e.g., a database) storing instructions and/or a public key. The public key and a private key may be a part of a key pair and the private key may be stored on a device. The system may include one or more hardware processors communicatively coupled to the non-transitory memory. The one or more hardware processors may be configured to execute the instructions to cause the system to perform operations. The system may be configured to receive the public key from the device. Subsequently, the system may receive a login credential from the device from a first user. The system may receive a request from the device from the first user to complete a transaction. The system may generate a nonce and send the nonce to the device. The system may receive an encrypted nonce from the device. The nonce may be encrypted with the private key stored in the secure enclave. The system may decrypt the encrypted nonce with the public key stored in the non-transitory memory. The system may compare the decrypted nonce to the nonce sent to the device. The system may determine whether the device is trustworthy based upon the comparison of the decrypted nonce to the nonce sent to the device. Based upon the determination of whether the device is trustworthy, the system may present an additional challenge to the user to complete the transaction. Responsive to a successful response to the additional challenge, the system may complete the transaction.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
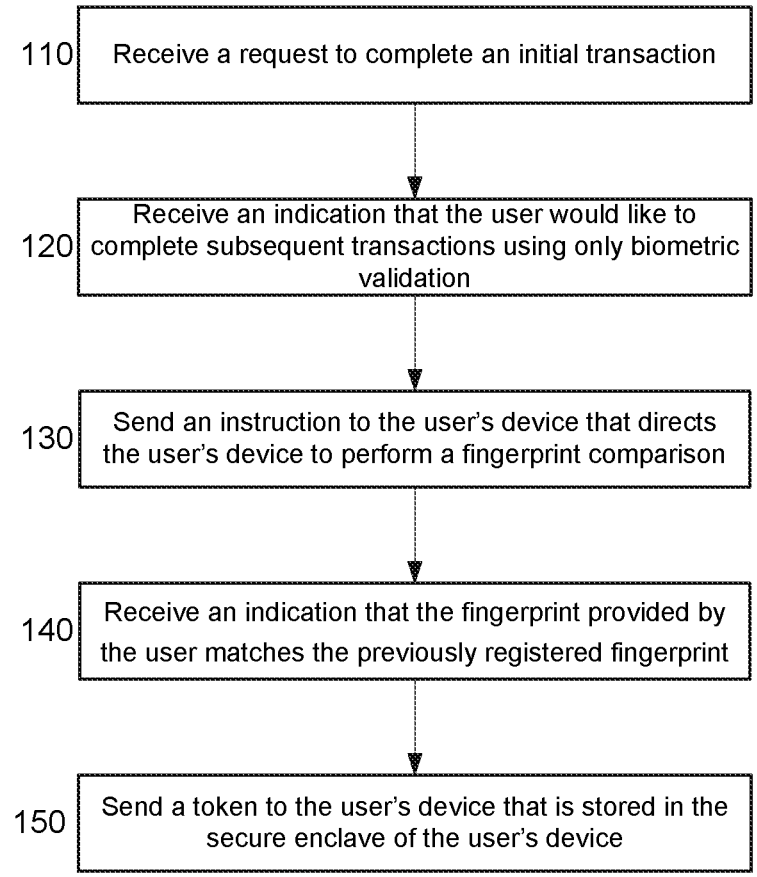
FIG. 1 is an example of an opt-in process by which a user may register for the biometric validation to complete a transaction as disclosed herein.

The disclosed implementations propose to solve the problems associated with current implementations for cookie-based solutions for determining user and/or device identity by a payment provider. The implementations may leverage Intel® Software Guard Extensions ("SGX") technology to allow for device specific identification to be queried on a client side (i.e., user) device, or the like. This may allow for (1) device-specific identification to be associated with a user's account with a payment provider, and/or (2) the payment provider to issue a specific token for the payment provider, including the instant checkout service of the payment provider, in which the token is signed by the payment provider. In some instances, a token may further be exchanged in combination with a biometric sensor data (e.g., a fingerprint, retinal pattern, face pattern) and/or a public/private key pair exchange between the payment provider and client device.

The disclosed implementations can mitigate the importance of a user password. For example, the user does not need to worry about losing the password or having the password stolen. Typically, a password for a user account of a payment provider is stored by the payment provider along with the passwords to other users' accounts. If the passwords are stolen, then potentially many user accounts could be compromised. The disclosed implementations can effectively replace the password, which is something that a user knows, with something that the user has on the user's personal device. In the event that a cyberattack occurs, it is unlikely to occur in a mass way. If the secure enclave is compromised, it can impact at most one individual associated with the device. Even in such an instance, however, because a fingerprint, or other biometric marker, is requested to complete the transaction in some implementations (i.e., what a user is), the user's account would still not necessarily be compromised. Thus, there is essentially a double barrier to mitigate the likelihood of a large-scale attack on the payment provider and/or user accounts.

Specific details of Intel® SGX technology are known to those of ordinary skill in the art. Briefly, Intel® SGX technology protects selected code and data from disclosure or modification. An application can be partitioned into processor-hardened "enclaves" which are protected areas of execution. The enclaves are protected from processes operating at higher privilege levels and operate inside the perimeter of the processor. In some configurations, the above-described features of SGX may be implemented at the software or operating system level.

A payment provider may, for example, provide a service to arrange payment from a user to a merchant. The merchant may offer an item for purchase online (e.g., an online retailer), via a brick and mortar store, and/or via an application operating on a smartphone. The payment provider may store one or more user account. Each user account may be associated with a user. The user account may have one or more funding sources for the account, such as a bank account and/or a credit card. The payment provider may act as an intermediary between a first user and a second user to transfer funds from a first user to a second user. Furthermore, the payment provider may allow a user to request funds from other users.

As stated earlier, when a user visits the payment provider's website, the user cannot log in to the website with the user's fingerprint to complete a transaction such as a payment to a merchant. In an implementation disclosed herein, a user device equipped with a biometric sensor and, for example, the Intel® SGX technology, can provide sufficient confidence to the payment provider to complete the transaction. A device of the user can refer to an electronic device such as a tablet, smartphone, laptop, and/or a desktop computer. A biometric sensor may refer to a fingerprint reader, a retinal scanner, face recognition, etc. A fingerprint reader can capture a digital image of a user's fingerprint. For example, the fingerprint reader may utilize a light-sensitive microchip such as a charge-coupled device or a complementary metal-oxide semiconductor to produce the digital image. Pattern matching algorithms may be applied to compare one fingerprint to another fingerprint. While the figures and examples may be described using a fingerprint scan as an example, other biometric data (e.g., a retinal scan, face recognition) may be used in a similar manner. The disclosed implementations are not limited to a particular type of biometric sensor or biometric data.

As disclosed herein, a token and/or a public/private key can be stored in a secure enclave that can be later used when a user logs into the payment provider's website. At that time, the user can simply swipe a fingerprint to complete a transaction (e.g., make a payment to an online retailer, transfer funds, or add an account). Thus, biometric authentication may be applied to complete the transaction. Moreover, the transaction can be completed across different browsers. Thus, once a user opts to enroll into the disclosed biometric validation to the user's account with the payment provider, the user can utilize any web browser to login to the user's account with the payment provider. This is advantageous over a cookie-based system, where a user would have to reenter login credentials (1) if the user enrolls in a first web browser, and subsequently utilizes a second browser, (2) if the user uninstalls the first web browser, or (3) deletes or clears the cookies of the web browser. Different web browsers utilize different cookie jars, and therefore, a cookie for one web browser is generally incompatible (e.g., not seen) by another web browser. In the disclosed implementations, the payment provider does not receive any information about a user's fingerprint. Thus, a payment profile is created across all of the web browsers on the device of the user according to the disclosed implementations.

In an implementation, an example of which is provided in FIG. 1, an opt-in process is provided by which a user may register for the disclosed features. At 110, a request may be received from a device of the user to complete an initial transaction. The request may be associated with a transaction such as completing payment to a merchant. Completing payment may refer to transferring money or funds from the user account with the payment provider to the merchant. That is, the payment provider may act as an intermediary between the user and the merchant to facilitate the transaction. A transaction may also include without limitation, a transfer of funds, adding a bank account, requesting funds, etc. When the user elects to complete the initial transaction, the payment provider may be utilizing a conventional cookie-based system to validate the user as described earlier. For example, the user may provider login credentials to the payment provider website. The initial transaction may be completed, and the payment provider may send the user a message to offer the user the option to utilize a biometric validation for subsequent transactions. For example, the user will not need to utilize login credentials (e.g., a user name and password) the next time the user would like to complete a transaction. Instead, the user may complete the transaction via the payment provider utilizing a fingerprint. The message may be displayed on the device of the user and may include a button that the user can select to indicate the user would like to opt into the program or not.

The user, if agreeable to the offer, may select the button to indicate agreement to opt in. The device of the user at 120, may send an indication, which is received by the payment provider server (e.g., a processor of the payment provider), that the user would like to complete subsequent transactions using a biometric validation (e.g., a fingerprint). An instruction may be sent to the device of the user that may direct the user to provide a fingerprint to the device or for the device to perform a fingerprint comparison at 130. The instructions may include machine readable code that instructs a processor of the device of the user to scan the user's fingerprint using a biometric scanner associated with the device. The device may have a previously registered fingerprint that the user provided stored in memory. For example, when the user first configured the device or activated the biometric sensor, it may have requested the user to provide a fingerprint. Thus, the user device may have a previously registered fingerprint that the device has associated with the user.

Upon detecting the user's finger being in position to be captured by the biometric sensor, and capturing a digital image of the user's fingerprint with the biometric sensor, the device may compare the obtained fingerprint to the previously registered fingerprint of the user. The user device may generate an indication regarding the comparison. The indication may be, for example, that a match exists or does not exist. If there is not a match between the obtained user fingerprint and the previously registered fingerprint, the payment provider may not allow the user to be enrolled in the disclosed biometric sensor login. At 140, the payment provider may receive the indication that there is a match between the obtained fingerprint and the previously registered fingerprint. At 150, the payment provider, responsive to receiving the indication that the fingerprint match exists, may send a token to the device of the user. The token is stored in the secure enclave of the device of the user. The token may be a long living token.

Figure 2:
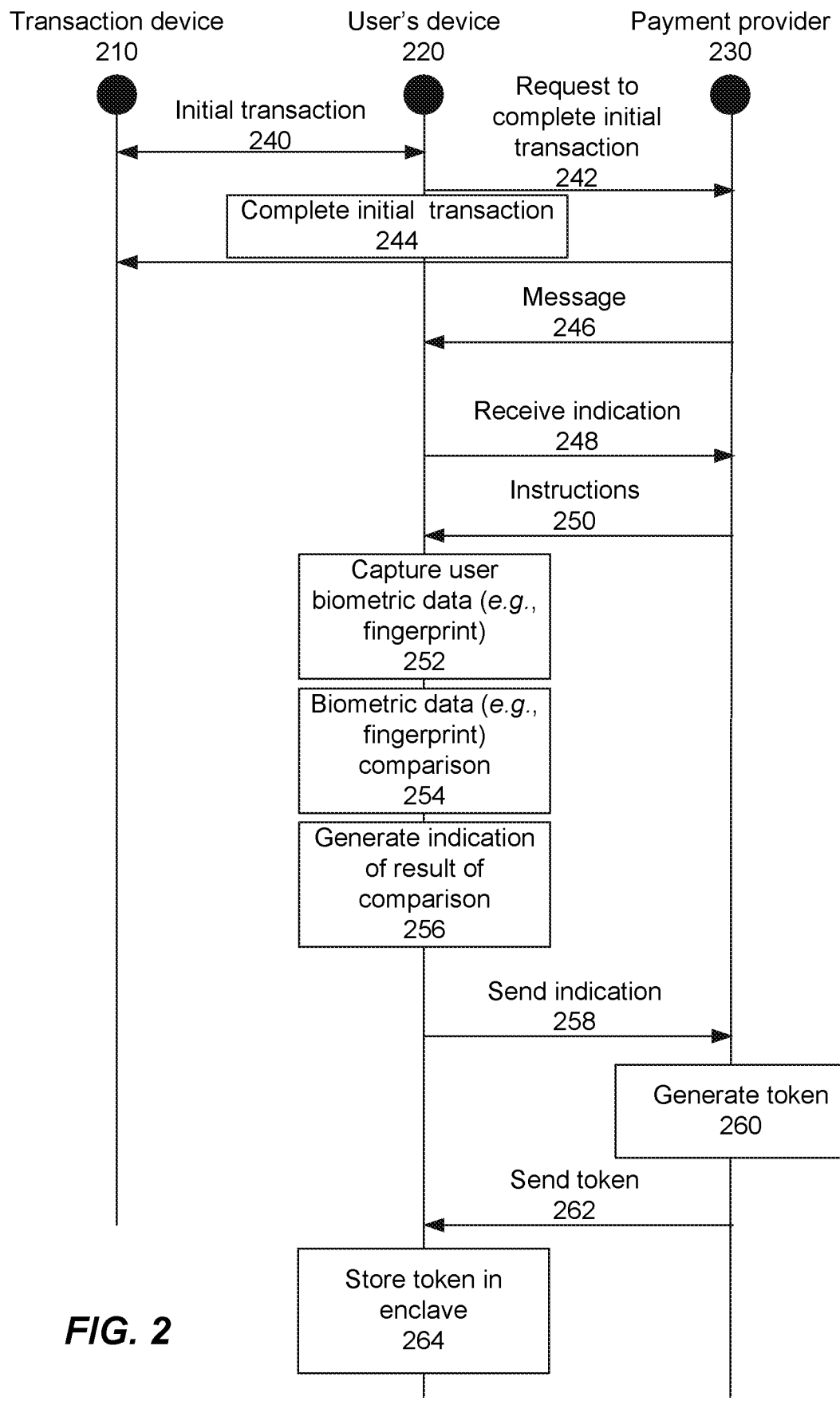
FIG. 2 illustrates an example of a system according to an implementation herein that is configured to perform an opt-in process by which a user may register for the biometric validation to complete a transaction.

FIG. 2 illustrates an example of a system according to an implementation herein that is configured to perform an opt-in process by which a user may register for the disclosed features. The system may include at least one non-transitory memory (e.g., a database) and one or more hardware processors that are components of the payment provider 230. The memory may store user account information such as a user's purchase history, funding instruments (bank account, credit card, etc.), requests for funding, etc. A user may utilize a device 220 to perform an initial transaction 240 with a device 210. The initial transaction device 210 may be, for example, a merchant server or another user's device. As an example, the user may be browsing an online retailer's website and decide to purchase an item. To complete the initial transaction 240, the user may elect to provide payment via the payment provider 230. The payment provider 230 may request login credentials from the user to complete the initial transaction 240 at 242. Upon receipt of the login credentials, and determining that they are valid, the payment provider 230 may complete the initial transaction 244 with the device 210, which in this example may include transferring funds from an account associated with the user's account with the payment provider 230 to the merchant device 210.

The payment provider may send a message 246 to the device of the user 220 as described above. The message may provide a mechanism by which the user may indicate the user's desire to opt in to the disclosed implementations. The payment provider 230 may receive the indication that the user would like to opt into the disclosed implementation (e.g., complete subsequent transactions utilizing biometric validation without having to enter other user credentials) 248. Responsive to receipt of the indication at 248, the payment provider 240 may transmit instructions 250 to the device of the user 220. The instructions 250 may cause the device of the user to direct the user to provide a fingerprint via the biometric sensor or device. The biometric device associated with the device of the user 220 may capture a digital image of the user's fingerprint 252. The device 220 may compare the captured digital image of the fingerprint with a previously registered fingerprint 254 that is stored on the device 220. Based on the comparison, the device 220 may generate an indication that indicates whether a match was made or not 256. The indication may be sent 258 to the payment provider 230.

The payment provider 230, upon receipt of the indication 256, may not allow the user to opt into the biometric 256, if the indication 256 indicates that a match was not made 258. Conversely, if the indication 256 is that a match exists between the captured fingerprint and the previously registered fingerprint of the user, then the payment provider 230 may generate and/or send a token 260 to the device of the user 220. The token may be sent to the user's device 220 at 262 and stored 264 in the secure enclave of the device of the user 220. As described earlier and in more detail below, the user may complete a subsequent transaction without entering login credentials. For example, the user may only be required to provide a fingerprint in order to complete the transaction. Furthermore, because the system is not dependent upon a cookie, if the user switches to a different browser, uninstalls a browser, and/or deletes cookies, the system can still identify the device associated with the user and complete the transaction.

Figure 3:
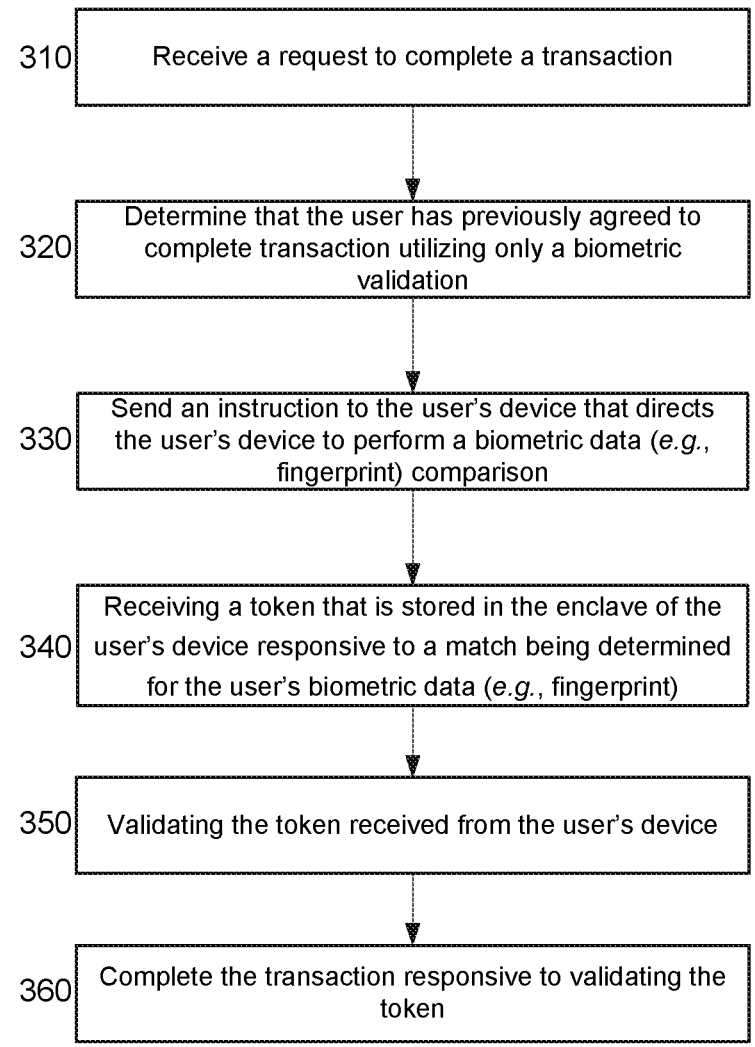
FIG. 3 illustrates an example of a process to complete a transaction according to an implementation disclosed herein.

FIG. 3 illustrates an example of a process to complete a transaction according to an implementation disclosed herein. At 310, a processor of the payment provider may receive a request from the device of a user to complete a transaction. The user, for the purposes of this example, may have already elected to complete transactions using, for example, a biometric validation. The payment processor may detect or determine that the user has previously agreed to complete transactions utilizing only a fingerprint at 320. For example, the payment processor may receive an indication of a flag that indicates the user previously opted into the disclosed process. A flag, as is known in computer programming, may refer to a bit field of a status register of a processor that can indicate the outcome of a particular operation. In this example, it may indicate that the user has previously opted into the disclosed processes. In some instances, a software based indication may be received from the user device when the user accesses the payment provider. For example, when the user accesses the payment provider, the payment provider may query the device for such a software indication to indicate whether or not the user has previously opted into the disclosed system (e.g., to utilize a biometric validation to complete a transaction instead of other login credentials).

An instruction may be sent to the device of the user at 330. The instruction may direct the device of the user to scan a fingerprint, or other biometric marker capable of being measured by a biometric sensor of the device, of the user. For example, the instruction may cause the device to indicate to display a message to the user to prompt the user to provide a fingerprint. The device of the user may obtain the fingerprint. The obtained fingerprint may be compared by the device to a previously registered fingerprint of the user that is associated with the device as described above. If the comparison indicates that a match did not exist, then the device may indicate the lack of a match to the payment provider. The payment provider may require the user to use a conventional login to complete the transaction (e.g., utilizing user credentials such as a user name and password) and/or require other challenges to validate the user. If the comparison indicates a match, then a token that was stored in enclave of the device of the user during the opt-in procedure described earlier may be received from the device by the payment provider at 340.

At 350, the token received from the user device may be validated. Validating the token may refer to a process by which the content of the token and/or its source may be analyzed to confirm that the token is valid. For example, it may include that the token is properly formatted, that the token has been received during its validity period, and/or that the token is digitally signed. Other checks regarding the validity of the token may be applied by the payment provider. If the token is determined to valid, then the payment provider may complete the transaction at 360. If the transaction is to complete an online purchase, for example, the payment provider may transfer funds to the appropriate merchant. Similarly, if the transaction is to transfer funds to another user, the payment provider may effect such a transfer.

Figure 4:
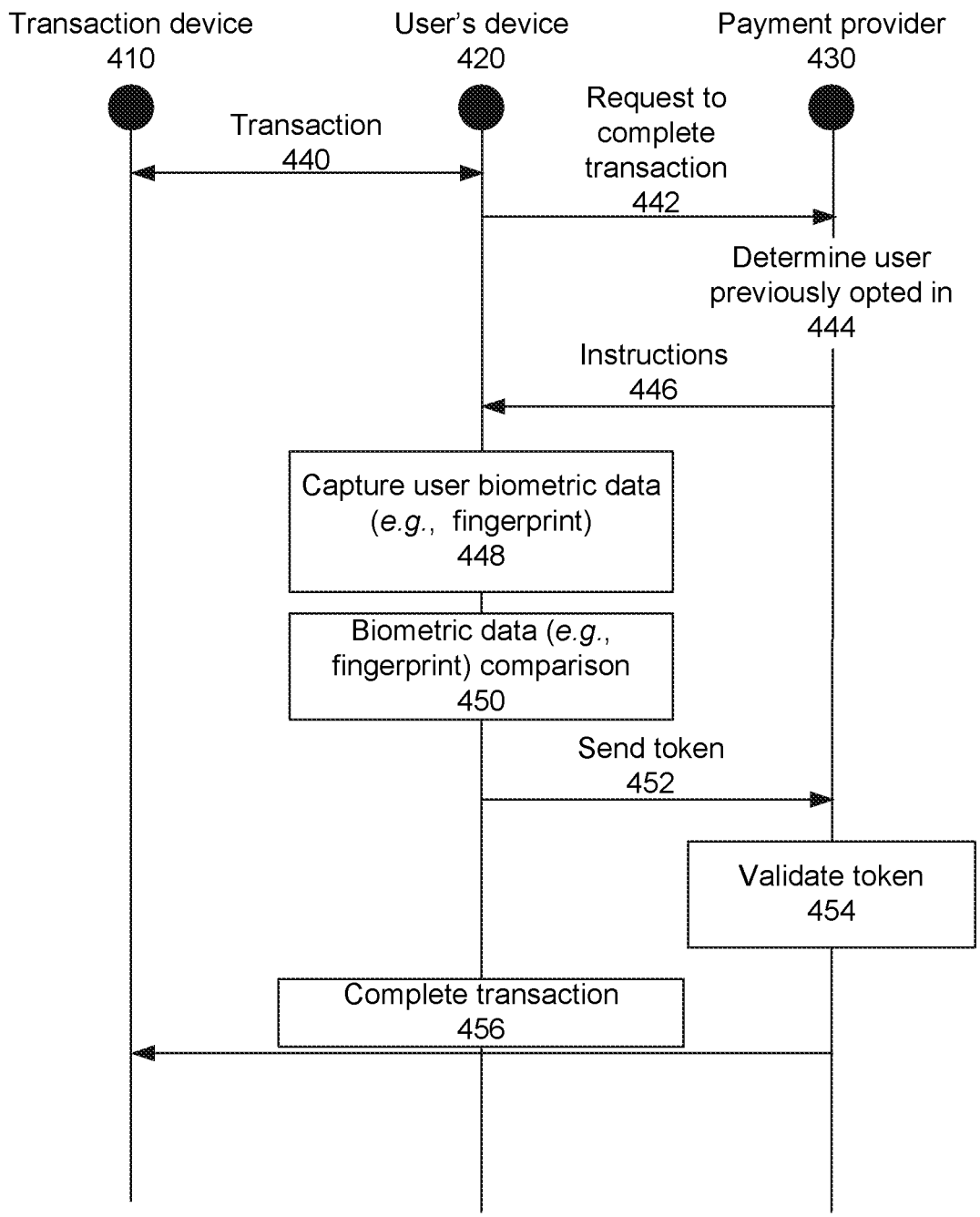
FIG. 4 is an example of a system is provided to complete a transaction as disclosed herein.

In an implementation, an example of which is provided in FIG. 4, a system is provided to complete a transaction. The system may include at least one non-transitory memory such as a database and one or more hardware processors communicatively coupled to the memory of a payment provider 430. The processor may execute instructions from the memory to cause the system to perform the processes described herein. A user may desire to complete a transaction 440 using a device 420. The user may have previously opted into the disclosed process by which the user can complete a transaction utilizing a fingerprint as described earlier. Thus, the transaction may be considered a transaction subsequent to the initial transaction. A token may be stored in an enclave of the user device 420. The user may be browsing a merchant's website which is operated by a third party device 410. The payment provider 430 may receive a request 442 from a device of the user 420 to complete a transaction with the merchant device 410. The payment provider 430 may determine that the user has previously agreed to complete transactions 444 utilizing only a fingerprint based on the stored user account information as described above. The payment provider may send an instruction 446 that directs the device of the user 420 to scan a fingerprint of the user. The device of the user may obtain a fingerprint scan of the user at 448.

The device of the user 420 may compare the obtained fingerprint to the previously registered fingerprint of the user 450. If a match is not determined, then the payment provider 430 may receive an indication that a match was not successful and require that the use provide additional login credentials and/or answer other challenges (e.g., additional security questions) to complete the transaction. If a match is determined, the device may send the token 452 to the payment provider 430. Thus, the token may only be received from the device of the user 420 if the fingerprint of the user provided in response to the instruction 446 matches a previously registered fingerprint of the user associated with the device 420. As described above, the payment provider 430 may validate the token received from the user device 454. Responsive to the validation of the token, complete the transaction 456.

According to an implementation disclosed herein, a long-term token may not be utilized. Instead, when a user opts into the disclosed implementation, a private and public key pair is generated on the client side device (e.g., user device). The private key may be stored in the secure enclave and the public key may be sent to the payment provider. Thus, there may be no token involved in this embodiment. An advantage of such an implementation is that there is no secret stored anywhere. In a subsequent transaction, when the user attempts to complete a transaction, the payment provider may determine that the user has already opted in to the disclosed system. The payment provider may generate a nonce and send the nonce to the client side device. When the nonce is received by the client side device, the user is asked to provide a fingerprint to the device to validate that the user is the legitimate user of the device. The device of the user may compare the received fingerprint to one previously registered with the device. If it matches, the private key stored in the enclave may be accessed. The private key may be utilized to encrypt the nonce and send it to the payment provider. The payment provider may decrypt the encrypted nonce with the public key, and compare the decrypted nonce to the nonce that it originally sent. If it matches, then the payment provider may complete the transaction as requested by the user. If it does not match, then the payment provider may not allow the transaction. Thus, this implementation may not use a long-term token. Furthermore, the private key may never leave the secure enclave of the device.

Figure 5:
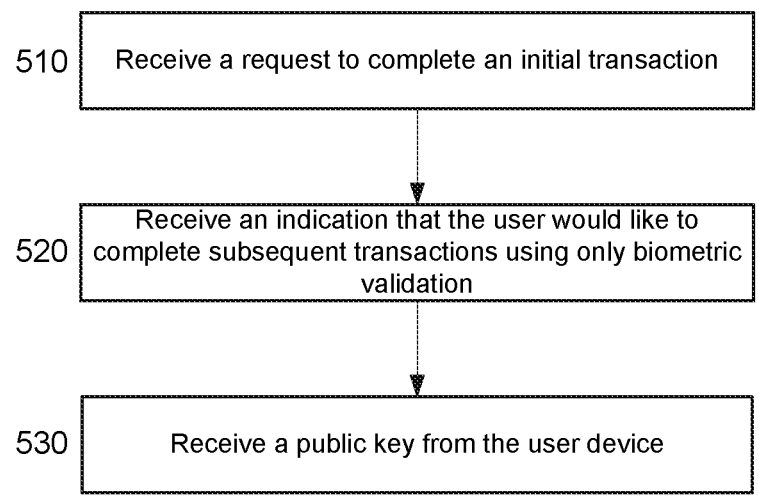
FIG. 5 is an example of an opt in process for the disclosed biometric validation utilizing a public and private key pair as disclosed herein.

FIG. 5 is an example of an opt in process for the disclosed biometric validation utilizing a public and private key pair as disclosed herein. At 510, a request may be received from the device of the user to complete an initial transaction. As above, the initial transaction may refer to a transaction that occurs before the user has opted into the disclosed biometric validation procedure with the payment provider. An indication may be received from the user to complete subsequent transactions using only a fingerprint at 520. For example, when the user completes the initial transaction with the payment provider, the user may be requested to provide the appropriate credentials (e.g., a user name and password). Once the user provides such credentials, the initial transaction may be completed via the payment provider. In addition, a message may be sent to the device of the user by the payment provider that inquires whether the user would like to participate in a biometric validation that would allow the user to complete subsequent transactions without providing anything other than a fingerprint. The user may indicate acceptance of this offer by, for example, clicking an "ok" button or the like on the user's device. The indication of the user's acceptance may be received by the payment provider. The payment provider may request or otherwise direct the user device to generate a public and private key pair. The private key may be stored in the secure enclave of the user's device while the public key may be received by the payment provider and associated with the user's account at 530. Thus, unlike the example implementations illustrated by FIGS. 1-4 in which a token is involved, in the example implementations illustrated by FIGS. 5-8, there is no token involved.

Figure 6:
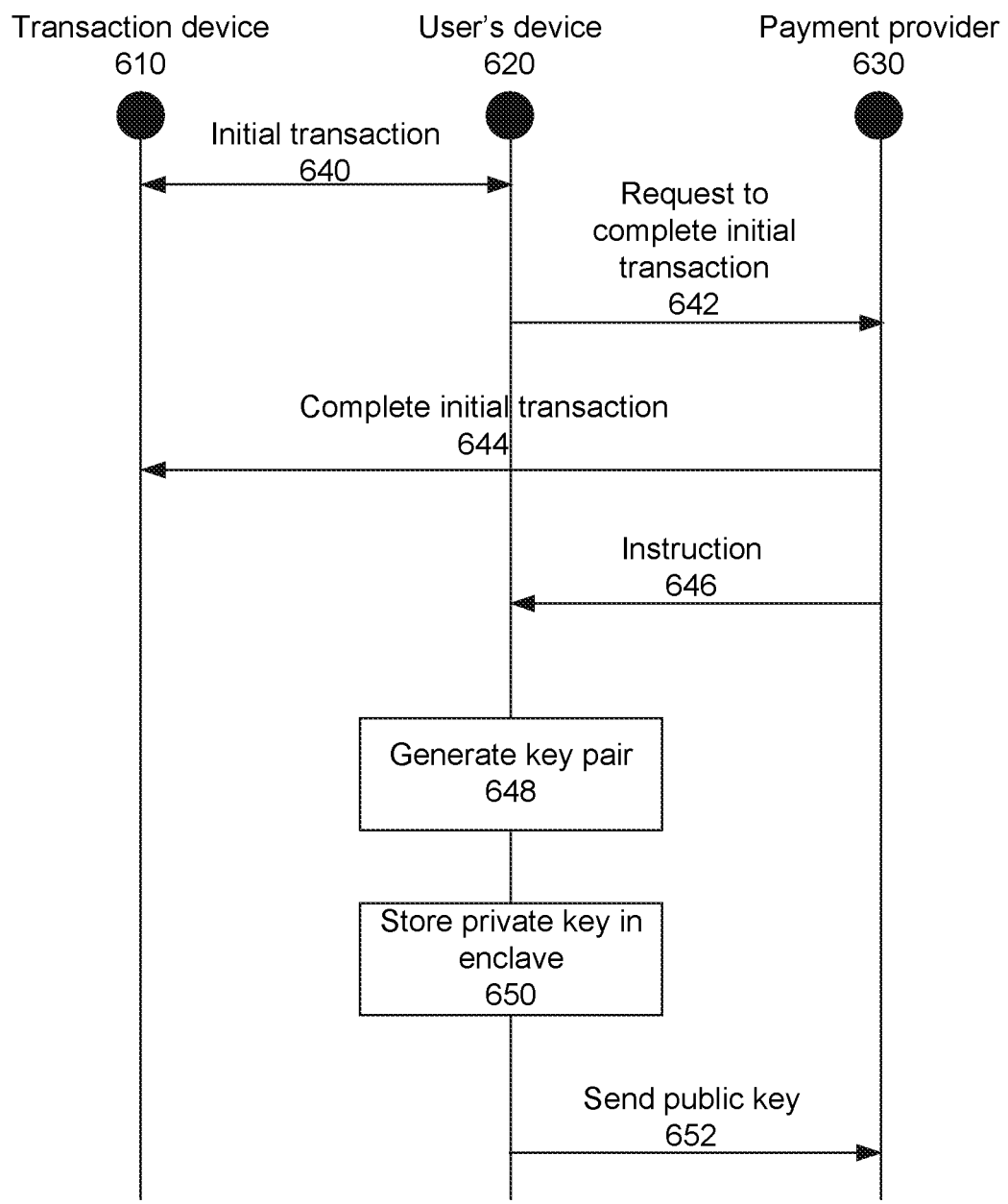
FIG. 6 is an example of a system that is configured to provide for the opt in process as disclosed herein.

FIG. 6 is an example of a system that is configured to provide for the opt in process as disclosed herein. The system may include at least one non-transitory memory and one or more hardware processors communicatively coupled to the memory of a payment provider 630. The memory may be configured to store, for example, a public key and/or user account information as described earlier. A user device 620 may be utilized to interact with a third party device 610 to initiate a transaction. For example, the third party device 610 may be a merchant device of an online retailer. The user may attempt to complete an initial transaction at 640 via the payment provider 630. Upon entering login credentials with the payment provider 630, the payment provider 630 may send to the user device 620 a message that is displayed 642 on the device of the user 620. The message may inquire whether the user would like to register for a biometric validation procedure to complete subsequent transactions (e.g., without having to provide further credentials). The payment provider 630 may receive an indication that the user would like to enroll in this process 644. The payment provider 630 may send an instruction 646 to the user's device 620 that asks the user's device 620 to generate a public and private key pair. Responsive to the instruction 646, the user's device 620 may generate the key pair 648. The private key may be stored in the secure enclave 650 of the user's device 620, while the public key may be sent 652 to the payment provider 630.

Figure 7:
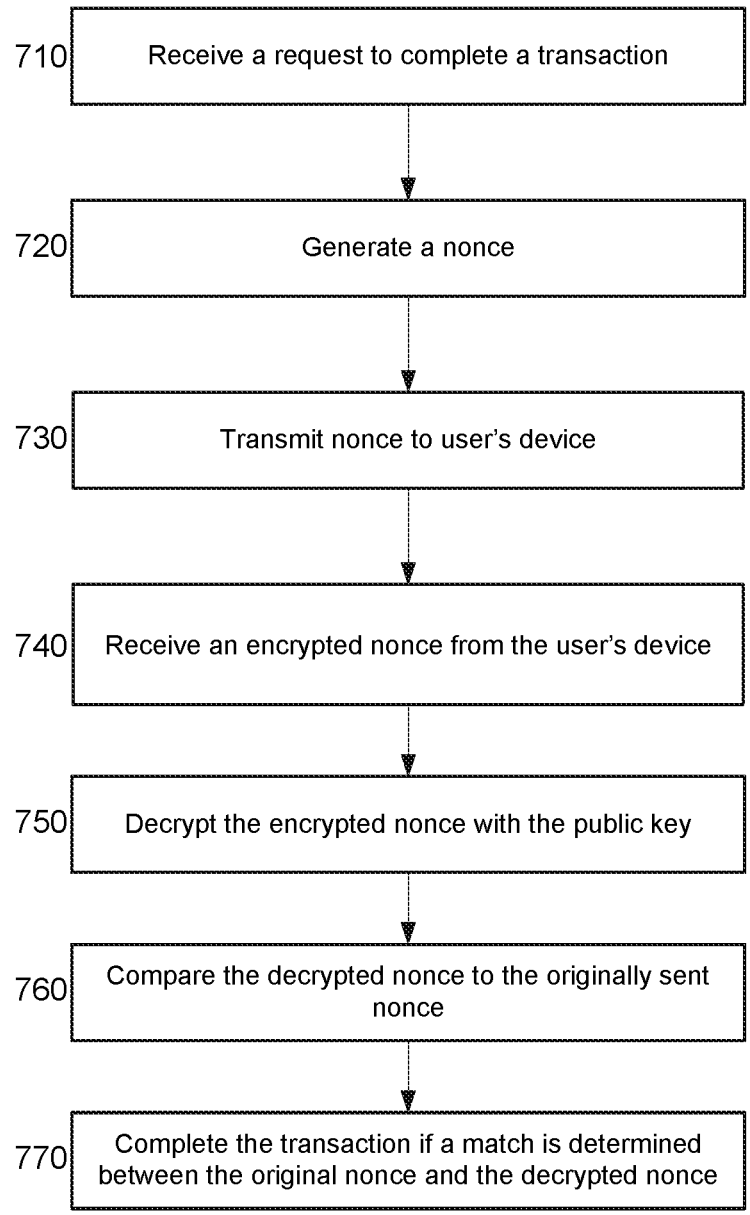
FIG. 7 is an example of a process to utilize the public/private key pair and biometric validation according to an implementation disclosed herein.

FIG. 7 is an example of a process to utilize the public/private key pair and biometric validation according to an implementation disclosed herein. At 710, a request to complete a transaction may be received by a payment provider. The user may have opted into the biometric validation process as described above. Thus, the transaction may be considered a transaction subsequent to the initial transaction. The payment provider may generate a nonce at 720. The nonce may be sent to the device at 730. The payment provider may also send instructions that direct the device of the user to obtain a fingerprint of the user and to return an encrypted nonce only if the obtained fingerprint matches a previously registered fingerprint stored on the user's device.

The device of the user may provide a visual indication to prompt the user to provide a fingerprint, and after capturing a digital image of the user's fingerprint, the user's device may compare the fingerprint to the previously registered fingerprint associated with the device. If a match is not determined, then the payment provider may be informed that no match was made. The payment provider may deny the user the ability to complete the transaction, and/or to continue to participate in the biometric validation. In some configurations, the payment provider may request that the user provide additional credentials to validate the user and complete the transaction. If, however, the device determines that the obtained fingerprint matches the previously registered fingerprint associated with the device, then the device may allow access to the private key to encrypt the nonce received from the payment provider. The user's device may send the encrypted nonce to the payment provider, which receives the encrypted nonce at 740. Thus, the private key may only be accessed if a match is determined.

The payment provider may utilize the public key stored in the non-transitory memory to decrypt the encrypted nonce at 750. At 760, the decrypted nonce may be compared to the nonce the payment provider originally sent at 730. If a match is not determined to exist, then the payment provider may require additional challenges to be met in order to complete the transaction, for example. If a match is determined to exist, then the payment provider may complete the transaction at 770 as described previously.

As with the previous examples, disclosed implementations allow a user to complete a transaction utilizing a biometric validation alone. Similarly, if the user uninstalls the web browser, deletes cookies, and/or uses one browser to initiate a transaction and a second browser to complete the transaction, the user can still utilize the biometric validation without having to reenter the user's credentials in a web browser for the subsequent transactions. In addition, the disclosed implementations offer improved security to the user and the payment provider. Where the payment provider offers an instant checkout service, it may allow additional scopes to the transactions to be added. For example, instead of being limited to an instant checkout service, additional scopes such as updating a funding instrument, sending/requesting funds, and/or a review of activity can be permitted because the payment provider can have greater confidence in the identity of the device and/or user associated with the device.

Figure 8:
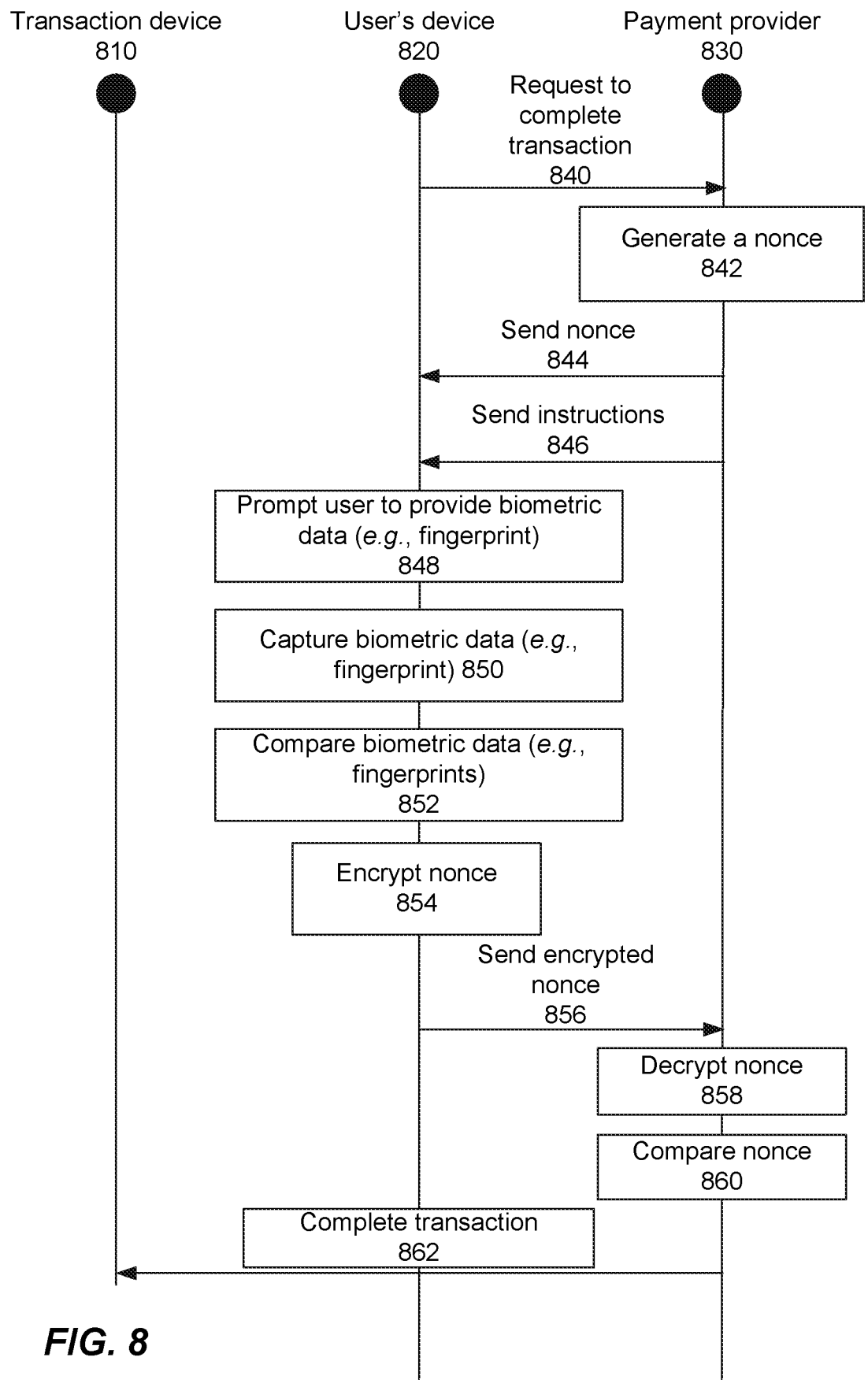
FIG. 8 is an example of a system configured to utilize the public/private key pair and biometric validation according to an implementation disclosed herein.

FIG. 8 is an example of a system configured to utilize the public/private key pair and biometric validation according to an implementation disclosed herein. The system may include at least one non-transitory memory and one or more hardware processors communicatively coupled thereto as described above. The memory of the payment provider 830 may store a public key for one or more user accounts. The processor of the payment provider may be configured to receive a request to complete a transaction 840 with the transaction device (e.g., a merchant). The user may have opted into the biometric validation process as described above. Thus, the transaction may be considered a transaction subsequent to the initial transaction. A private key may be stored in a secure enclave on the device of the user 820. The payment provider 830 may generate a nonce at 842. The nonce may be sent 844 to the device 820. The payment provider 830 may also send instructions 846 that direct the device of the user 820 to obtain a fingerprint of the user and to return an encrypted nonce only if the obtained fingerprint matches a previously registered fingerprint stored on the user's device 820. The nonce and the instructions may be sent separately or as part of a single payload.

The device of the user 820 may provide a visual indication to prompt the user to provide a fingerprint 848, and after capturing a digital image of the user's fingerprint 850, the user's device 820 may compare the fingerprint to the previously registered fingerprint associated with the device 852. If a match is not determined, then the payment provider 830 may be informed that no match was made. The payment provider 830 may deny the user the ability to complete the transaction, and/or to continue to participate in the biometric validation. In some configurations, the payment provider 830 may request that the user provide additional credentials to validate the user and complete the transaction as described above. In the event that the device 820 determines that the obtained fingerprint matches the previously registered fingerprint associated with the device, then the device 820 may allow access to the private key to encrypt the nonce 854 received from the payment provider 830. The user's device 820 may send the encrypted nonce 856 to the payment provider 830.

Payment provider 830 may utilize the public key stored in the non-transitory memory to decrypt the encrypted nonce 858. The decrypted nonce may be compared to the nonce the payment provider originally sent 860. If a match is not determined to exist, then the payment provider 830 may present additional challenges to the user as described earlier.

If a match is determined to exist, then the payment provider 830 may complete the transaction 862 as described previously.

Figure 9:
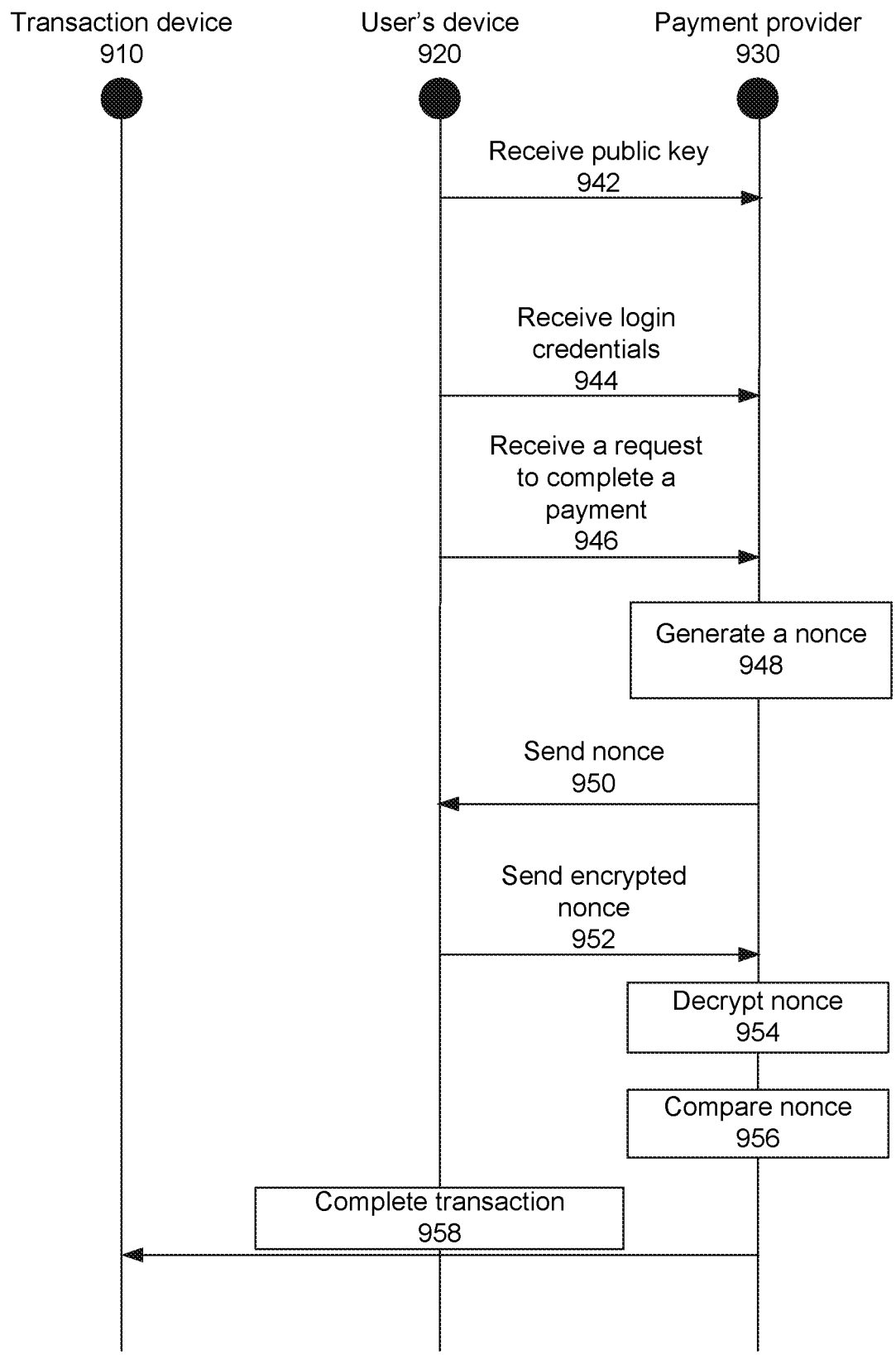
FIG. 9 is an example implementation of a system by which a public/private key pair is utilized as part of a validation process as disclosed herein.
Figure 10:
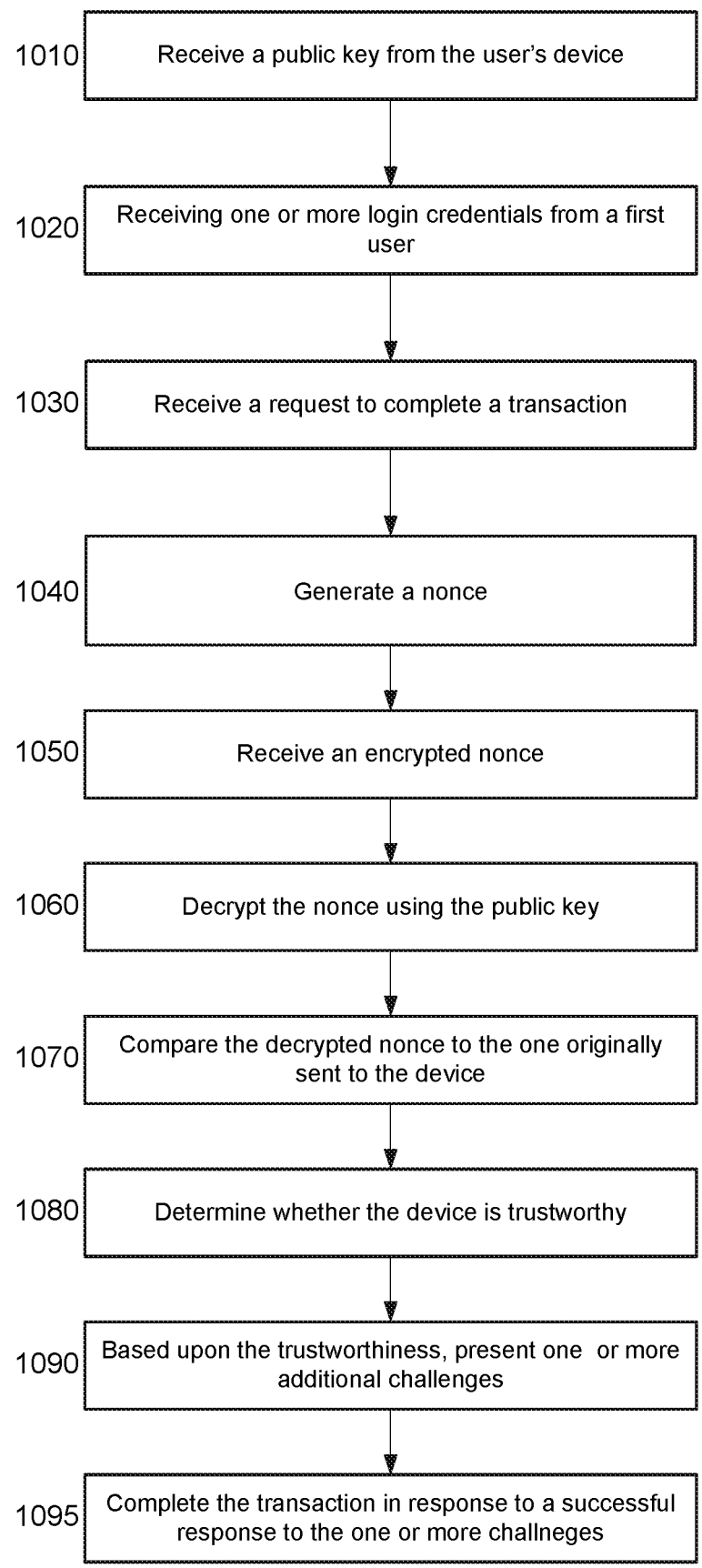
FIG. 10 is an example of the process performed by the system of FIG. 9 as disclosed herein.

FIG. 9 is an example implementation of a system by which a public/private key pair is utilized as part of a validation process as disclosed herein. FIG. 10 is an example of the process performed by the system of FIG. 9. The system may include a payment provider 930 with one or more hardware processors communicatively coupled to at least one non-transitory memory such as a database as described in previous implementations. At 1010, the processor of the payment provider 930, may receive the public key 942 from a public device 920. The public device may not be associated with a particular user; rather, it may be shared by multiple users and/or considered a common computer such as a computer at a university library. The public key may be stored to the non-transitory memory of the payment provider 930.

The public key may be received at a time prior to when a user logs into the payment provider for a first time. The device 920 may generate a public and private key pair 940 the device 920 first visits a website of the payment provider. For example, the payment provider may send an instruction to the device that requests the device generate the public and private key pair. As an example, the device 920 may determine that the payment provider 930 is a trusted authority based upon a digitally signed certificate that the payment provider 930 provides to the device. The payment provider 930 may send a request to the device to obtain the public key. Subsequent to receiving the public key, at 1020, a login credential may be received 944 from the device 920 from a first user. The login credential may be, for example, an email address, a user name, a password, a personal identification number, etc. A request may be received 946 by the payment provider 930 to complete a transaction at 1030 (e.g., pay for a purchase with a merchant using funds associated with the user's account with the payment provider). The payment provider may generate a nonce 948 at 1040. The nonce may be sent to the device 920 whereby the device may encrypt the nonce using the private key 950 that is stored in the secure enclave of the device. In this implementation, there is no fingerprint required in order to access the private key. Rather, the fact that the payment provider has requested the nonce be digitally signed by the device (e.g., encrypted with the private key) is sufficient to cause the device to encrypt the nonce with the private key. The private key may not be shared and cannot be modified by an external source. The encrypted nonce may be sent to the payment provider 930 at 952, 1050 where it is decrypted at 954 using the public key stored in the non-transitory memory of the payment provider 930 at 1060. The payment provider 930 at 1070, may compare the decrypted nonce to the one originally sent to the device 954.

Based on the comparison, the payment provider 930 may determine whether the device is trustworthy at 956, 1080. The payment provider, for example, may store a history of activity associated with the device 920 in the non-transitory memory. The history may pertain to the usage of the device 920 by more than one user. For example, if the device 920 is a public computer, and multiple users have utilized the device to complete a transaction, the history of those transactions and users' activities may be stored in the non-transitory memory. Because the history is associated with the device, rather than a cookie, even if the web browser is uninstalled, browsing history is deleted, cookies are cleared, etc., the payment provider 930 may have a mechanism to ascertain whether or not to blacklist or whitelist the device 920. Blacklisting a device may refer to preventing transactions from being completed from the device or requiring additional challenges (e.g., requiring a user name, password, portion of a social security number, answers to user-specific security challenges, entry of a personal identification number, verification of user identity via a text and/or email, a biometric scan, etc.) to ensure that the user is a legitimate user. Whitelisting a device may refer to allowing a transaction to be completed with minimal additional challenges (e.g., it may require only a username and password). Thus, if a device 920 has been utilized without any issues by multiple users, it may be whitelisted or deemed a trustworthy device. If, however, a user has been a bad actor (e.g., attempted a fraudulent transaction), then the device may be blacklisted. The payment provider may utilize a scale to rank the trustworthiness of each device 920, and scale may be based on the number of instances and/or temporal proximity of the incidents to the present. Thus, a device with a lot of fraudulent transaction attempts near to the present day, may be blacklisted and/or require stringent additional challenges to ensure the user requesting completion of a transaction is legitimate. However a device that has not had any fraudulent attempts in the recent past (i.e., within the past year), may be whitelisted. The payment provider 930 may request that the user of the whitelisted device provides only a user name and password in order to complete the transaction.

Thus, at 1090, based upon the determination of the devices trustworthiness, additional challenges may be presented to the user to complete the transaction 958. The transaction may be completed if the user can successfully provide responses to the additional challenges at 960, 1095. As above, a transaction may refer to transferring and/or receiving funds, requesting funds, updating a funding instrument, adding a funding instrument (e.g., a bank account and/or credit card), paying for a purchase, etc.

Figure 11:
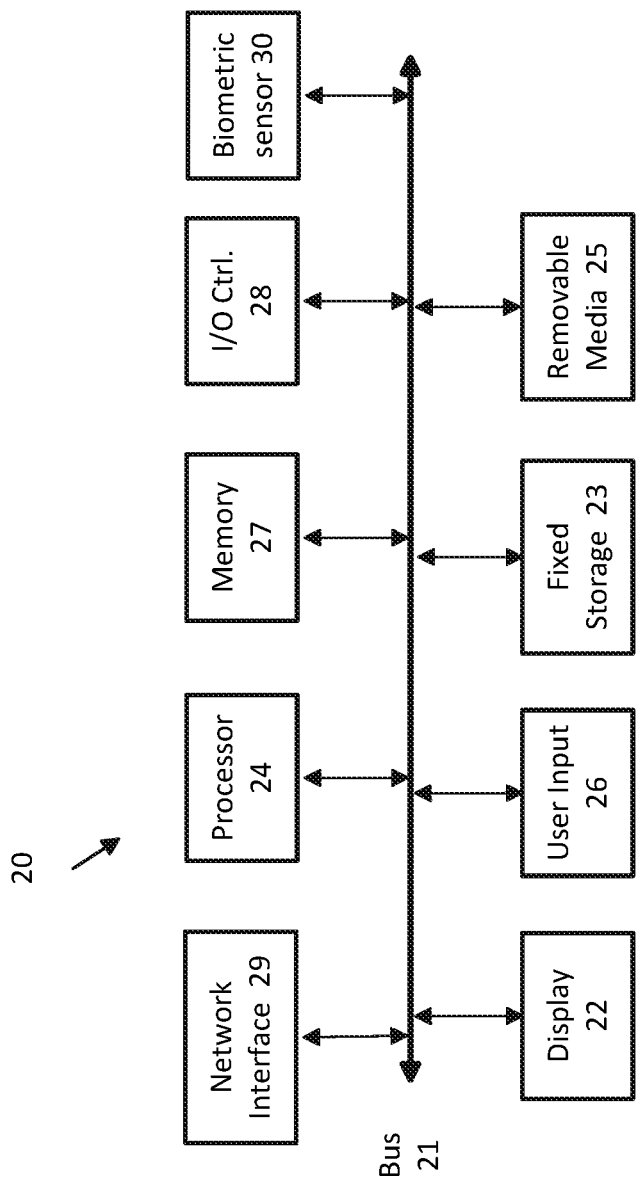
FIG. 11 is an example computer (e.g., electronic device such as a smartphone, tablet, laptop, personal computer, etc.) suitable for implementing embodiments of the presently disclosed subject matter.

Embodiments of the presently disclosed subject matter may be implemented in and used with a variety of component and network architectures. FIG. 11 is an example computer 20 (e.g., electronic device such as a smartphone, tablet, laptop, personal computer, etc.) suitable for implementing embodiments of the presently disclosed subject matter. The computer 20 includes a bus 21 which interconnects major components of the computer 20, such as a central processor 24, a memory 27 (typically RAM, but which may also include read-only memory ("ROM"), flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like. The secure enclave (not illustrated) may be processor-hardened area of execution that is accessible by the processor 24 and is associated with the processor. The enclave may be a partitioned space that is otherwise protected from access by other processes external to the processor 24.

The bus 21 allows data communication between the central processor 24 and the memory 27, which may include ROM or flash memory (neither shown), and RAM (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25. A biometric sensor 30 may be integrated with the electronic device or attached as a peripheral device. The biometric sensor 30 may be configured to perform a digital capture of a fingerprint, capture a retinal scan, perform face recognition, etc. The processor 24 may compare the captured fingerprint or other biometric marker to a previously registered fingerprint or other biometric marker, respectively, of a user that is stored in memory 27, fixed storage 23, and/or removable media 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks. Many other devices or components (not shown) may be connected in a similar manner (e.g., digital cameras or speakers). Conversely, all of the components shown in FIG. 11 need not be present to practice the present disclosure. The components can be interconnected in different ways from that shown. The operation of a computer such as that shown in FIG. 11 is readily known in the art and is not discussed in detail in this application. Code to implement the present disclosure can be stored in computer-readable storage media such as one or more of the memory 27, fixed storage 23, removable media 25, or on a remote storage location.

Figure 12:
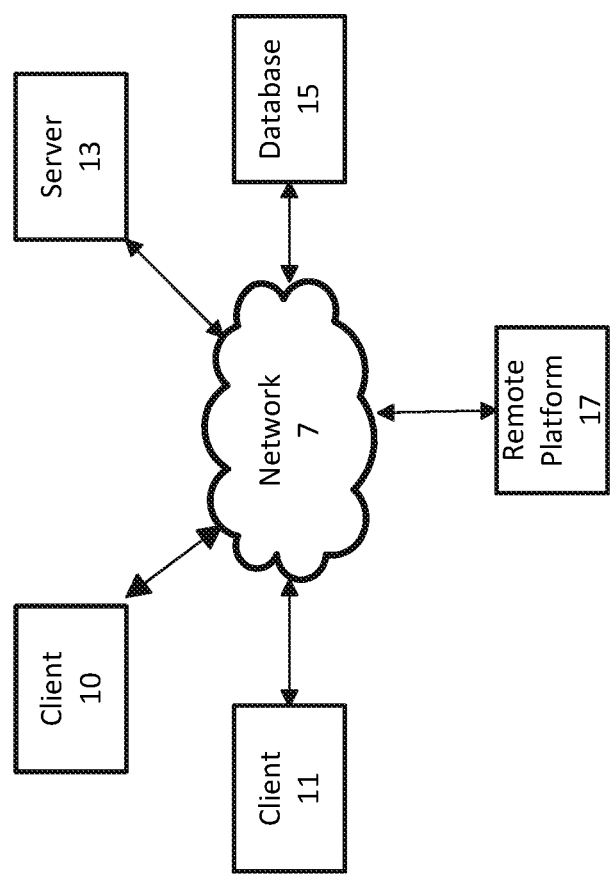
FIG. 12 shows an example network arrangement according to an embodiment of the disclosed subject matter.

FIG. 12 shows an example network arrangement according to an embodiment of the disclosed subject matter. One or more clients (e.g., user devices) 10, 11, such as local computers, smartphones, tablet computing devices, and the like may connect to other devices via one or more networks 7. As described earlier, the communication partner may operate a client device that is remote from the device operated by the user (e.g., in separate locations). The network may be a local network, wide-area network, the Internet, or any other suitable communication network or networks, and may be implemented on any suitable platform including wired and/or wireless networks. The clients may communicate with one or more servers (e.g., of payment provides) 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter.

When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A method comprising:
   implementing at least a portion of an enrollment process in which a user is permitted to enroll in biometric validation in response to providing valid biometrics, wherein the implementing includes:
   receiving, from a device of the user via a first web browser, an indication that a first biometric obtained from the user matches a previously registered biometric of the user that was registered before the user opted to use the biometric validation; and
   in response to receiving the indication, instructing the device of the user to generate a keypair that includes a public key and a private key;
   receiving the public key from the device after instructing the device to generate the keypair, wherein the public key is stored by a server, wherein the private key is stored in a secure memory area of the device;

receiving, from the device of the user via a second web browser, a request to complete a transaction initiated by the user at the device, the transaction accessing a user account at the server;

responsive to receiving the request and based on a determination that the user opted to use the biometric validation, generating a nonce for authentication of the device;

sending, to the device, the nonce and instructions that direct the device to obtain a second biometric of the user for additional authentication;

receiving an encrypted nonce from the device, the nonce encrypted with the private key stored in the secure memory area that can only be accessed if the second biometric matches the previously registered biometric associated with the device;

decrypting the encrypted nonce with the public key of the keypair based on the device being previously authenticated for accessing the user account at the server; and completing the transaction in response to determining that the decrypted nonce matches the nonce sent to the device.

2. The method of claim 1, wherein the determination that the user opted to use the biometric validation is based on receiving the public key of the keypair.

3. The method of claim 1, wherein the private key stored in the secure memory area of the device can only be accessed if an obtained fingerprint matches a previously registered fingerprint associated with the device.

4. The method of claim 1, wherein the device is implemented using one of a tablet, a laptop, a smartphone, and a desktop computer.

5. The method of claim 1, wherein the second biometric of the user comprises a fingerprint of the user.

6. The method of claim 1, further comprising:
after receiving the request to complete the transaction, querying the device for a software indication that indicates that the user previously opted to use the biometric validation to complete transactions, wherein the determination that the user opted to use the biometric validation is based on the software indication.

7. The method of claim 1, wherein the transaction is one of a payment, addition of a bank account, a transfer of funds, and a request for funds at the user account.

8. A payment provider server, comprising:
a non-transitory memory storing instructions; and
a processor configured to execute the instructions to cause the payment provider server to:
  receive, from a device of a user via a first web browser as part of implementing an enrollment process in which a user is permitted to enroll in biometric validation in response to providing valid biometrics, an indication that a first biometric obtained from the user matches a previously registered biometric of the user that was registered before initiation of the enrollment process for the user;
  instruct, as part of implementing the enrollment process, the device of the user to generate a keypair that includes a public key and a private key;
  receive, from the device of the user via a second web browser, a request to complete a transaction initiated by the user at the device, the transaction accessing a user account at the server;
  access the public key previously received from the device as part of the enrollment process, wherein the private key is stored in a secure element of the device;
  responsive to the request and based on a determination that the user opted to use the biometric validation, generate a nonce for authentication of the transaction at the device;
  transmit, to the device, the nonce and instructions to cause the device to obtain a second biometric of the user for additional authentication;
  receive, from the device, an encrypted nonce that was encrypted with the private key stored in the secure element that is accessible based on the second biometric matching the previously registered biometric associated with the device;
  decrypt the encrypted nonce with the public key of the keypair; and
  complete the transaction in response to determining that the decrypted nonce matches the nonce sent to the device.

9. The server of claim 8, wherein the private key stored in the secure element of the device can only be accessed if an obtained fingerprint matches a previously registered fingerprint associated with the device.

10. The server of claim 8, wherein the second biometric of the user comprises a fingerprint of the user.

11. A non-transitory machine-readable medium having instructions stored thereon, the instructions executable to cause performance of operations comprising:
receiving, from a device of a user via a first web browser as part of implementing an enrollment process in which a user is permitted to enroll in biometric validation in response to providing valid biometrics, an indication that a first biometric obtained from the user matches a previously registered biometric of the user at the device;

receiving a public key of a keypair after receiving the indication and instructing the device of the user to generate the keypair that includes the public key and a private key;

receiving, from the device of the user via a second web browser, a request to complete a transaction initiated by the user at the device, the transaction accessing a user account at a server;

accessing the public key previously received from the device, wherein the private key is stored in a secure enclave of the device;

responsive to the request and based on a determination that the user opted to use the biometric validation, generating a nonce for authentication of the transaction at the device;

transmitting, to the device, the nonce and instructions to cause the device to obtain a second biometric of the user for additional authentication;

receiving, from the device, an encrypted nonce that was encrypted with the private key stored in the secure enclave that is accessible based on the second biometric matching the previously registered biometric associated with the device;

decrypting the encrypted nonce with the public key of the keypair; and completing the transaction in response to determining that the decrypted nonce matches the nonce sent to the device.

12. The non-transitory machine-readable medium of claim 11, wherein the private key stored in the secure enclave of the device can only be accessed if an obtained fingerprint matches a previously registered fingerprint associated with the device.

13. The method of claim 1, further comprising:
receiving, from the user, login credentials as part of a different transaction; and
after completing the different transaction, inquiring whether the user wishes to enroll in the biometric validation.

14. The method of claim 1, further comprising:
sending, to the device, a request to display a message that includes an option to enroll in the biometric validation.

15. The method of claim 1, wherein the determination that the user opted to use the biometric validation is based on receiving an indication of a flag that indicates that the user previously opted to use the biometric validation to complete transactions.

* * * * *